(12) United States Patent
Xia et al.

(10) Patent No.: US 9,828,846 B2
(45) Date of Patent: Nov. 28, 2017

(54) SELF-DIAGNOSING COMPOSITE SLICKLINE CABLES

(71) Applicant: Halliburton Energy Services, Inc., Houston, TX (US)

(72) Inventors: Hua Xia, Huffman, TX (US); Sean Thomas, Frisco, TX (US); David L. Perkins, The Woodlands, TX (US); John L. Maida, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 7 days.

(21) Appl. No.: 14/766,795

(22) PCT Filed: Jul. 31, 2014

(86) PCT No.: PCT/US2014/049064
§ 371 (c)(1),
(2) Date: Aug. 10, 2015

(87) PCT Pub. No.: WO2016/018343
PCT Pub. Date: Feb. 4, 2016

(65) Prior Publication Data
US 2016/0265339 A1    Sep. 15, 2016

(51) Int. Cl.
*E21B 47/12*    (2012.01)
*E21B 47/00*    (2012.01)
(Continued)

(52) U.S. Cl.
CPC .............. *E21B 47/00* (2013.01); *E21B 17/00* (2013.01); *G02B 6/4411* (2013.01);
(Continued)

(58) Field of Classification Search
CPC .... G02B 6/504; G02B 6/4411; G02B 6/4416; E21B 14/12; E21B 17/20
See application file for complete search history.

(56) References Cited

U.S. PATENT DOCUMENTS 4,988,875 A * 1/1991 Ortiz .................... G01N 21/88
                                                     250/330
5,034,140 A      7/1991 Gardner et al.
(Continued)

FOREIGN PATENT DOCUMENTS

EP      2418466 A2      2/2012
WO   2015041649 A1      3/2015
WO   2016018343 A1      2/2016

OTHER PUBLICATIONS

International Search Report and Written Opinion for PCT/US2014/049064 dated Apr. 27, 2015.
(Continued)

*Primary Examiner* — David Porta
*Assistant Examiner* — Faye Boosalis
(74) *Attorney, Agent, or Firm* — McDermott Will & Emery LLP

(57) ABSTRACT

Downhole slickline cable including a polymer matrix having reinforcing fibers embedded therein. A plurality of integrity-sensing optical fibers are embedded within the polymer composite and extend along an axial length of the downhole slickline cable that enables slickline cable structural and mechanical integrity self-diagnosis. The cable may include energy transmission lines that include one or more integrity-sensing optical fibers.

21 Claims, 4 Drawing Sheets

(51) Int. Cl.
  *H01B 7/04*    (2006.01)
  *E21B 17/00*   (2006.01)
  *G02B 6/44*    (2006.01)
  *G02B 6/50*    (2006.01)
  *H01B 7/32*    (2006.01)
  *E21B 19/08*   (2006.01)

(52) U.S. Cl.
  CPC .......... *G02B 6/4416* (2013.01); *G02B 6/504* (2013.01); *H01B 7/046* (2013.01); *E21B 19/08* (2013.01); *E21B 47/122* (2013.01); *H01B 7/32* (2013.01)

(56) References Cited

U.S. PATENT DOCUMENTS

| | | | |
|---|---|---|---|
| 5,633,220 A | 5/1997 | Cawiezel et al. | |
| 6,542,231 B1 * | 4/2003 | Garrett | G01N 21/05 250/227.11 |
| 2004/0047534 A1 | 3/2004 | Shah et al. | |
| 2007/0044991 A1 | 3/2007 | Varkey | |
| 2009/0200033 A1 | 8/2009 | Kakadjian et al. | |
| 2009/0283259 A1 | 11/2009 | Poitzsch et al. | |
| 2010/0155059 A1 | 6/2010 | Ullah | |
| 2012/0176250 A1 * | 7/2012 | Duncan | G01V 11/002 340/853.2 |
| 2012/0205107 A1 | 8/2012 | Rickman et al. | |
| 2013/0192837 A1 | 8/2013 | Curtis et al. | |
| 2013/0284437 A1 | 10/2013 | Nguyen et al. | |
| 2013/0312962 A1 | 11/2013 | Weaver et al. | |
| 2014/0034309 A1 | 2/2014 | Saini et al. | |
| 2015/0068744 A1 | 3/2015 | Welton et al. | |

OTHER PUBLICATIONS

International Search Report and Written Opinion for PCT/US2014/045653 dated Mar. 24, 2015.

Oliveira et al., Invert Emulsion Acid for Simultaneous Acid and Proppant Fracturing, OTC 24332, 2013.

* cited by examiner

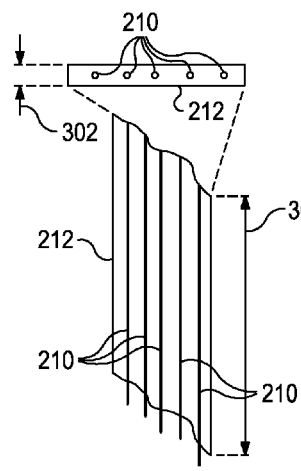 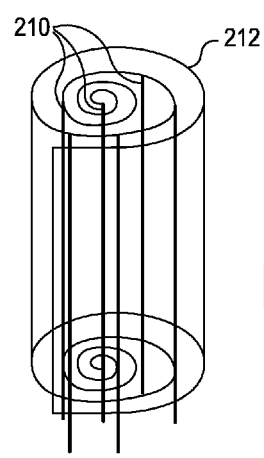 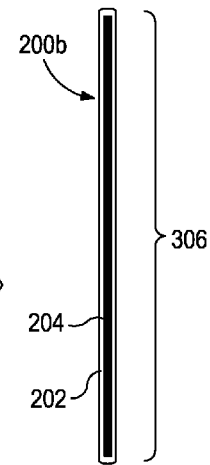
FIG. 3A　　　　　FIG. 3B　　　　　FIG. 3C
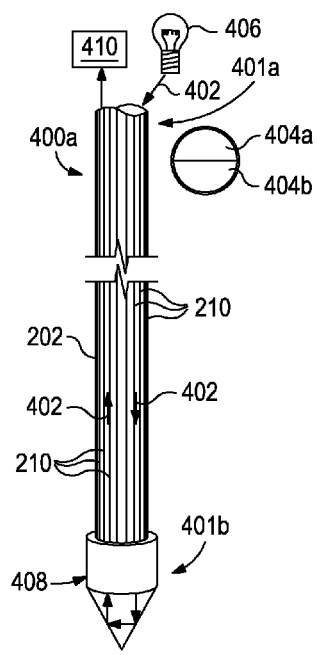 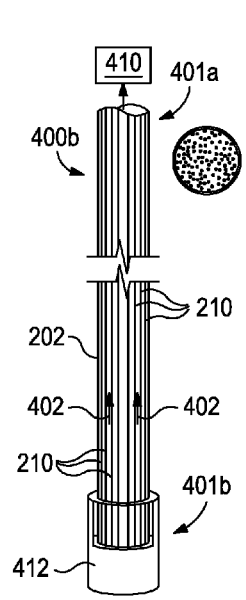 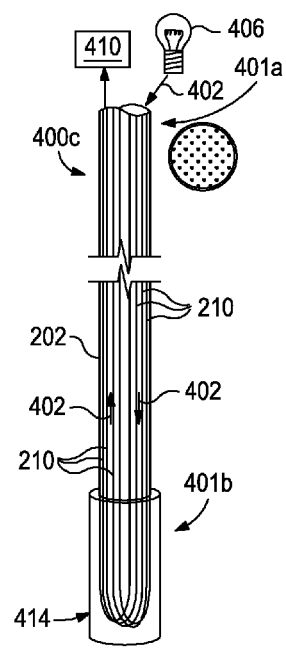
FIG. 4A　　　　　FIG. 4B　　　　　FIG. 4C

SELF-DIAGNOSING COMPOSITE SLICKLINE CABLES

BACKGROUND

The present disclosure is related to equipment used during subterranean formation operations and, more particularly, to composite slickline cables including optical fibers that enable functionality diagnostics for reliable subterranean operations and services.

Hydrocarbons are typically produced from wellbores drilled from the Earth's surface through a variety of producing and non-producing subterranean zones. The wellbore may be drilled substantially vertically or may be drilled as a lateral well that has some amount of horizontal displacement from the surface entry point. A variety of servicing operations may be performed in the wellbore, such as mechanical intervention services and formation property evaluations, after it has been drilled by lowering different kinds of downhole tools into the wellbore. For example, measuring instruments are commonly lowered into the wellbore to obtain various downhole conditions, such as depth-dependent formation pressure and temperature, formation porosity, fluid viscosity, and density. Various sampling and/or logging devices are also commonly lowered into the wellbore to either analyze fluid samples in-situ at various target zones of the subterranean formation or extract formation fluids for surface laboratory analysis.

Such servicing operations are typically undertaken by lowering the downhole tool into the wellbore on a wireline cable or a slickline cable. Specifically, slickline cables are either single-strand or multi-strand wires or cable that often contain energy transmission conductors (e.g., optical fibers, electrical wires, acoustic transceivers, etc.) or other electrical components commonly used in oil or gas operations. Slickline cables can be made of stainless steel, or other metal and alloy materials, but have more recently been made of fiber-reinforced polymer composite based materials, which may improve toughness and exhibit increased resistance to fatigue and corrosion over metal slickline cables. Another advantage of a polymer composite material based slickline cable is its lighter weight could enable services in deeper onshore and offshore wells.

A polymer composite material based slickline cable is required to have sufficient tensile strain capability or mechanical strength to support both the weight of the downhole tool and the slickline cable, and also have sufficient strength to perform mechanical services. The characteristics of traditional slickline cables, in combination with the extreme conditions of subterranean environments, may increase the likelihood that such cables fail due to mechanical fatigue, wearing, and transient overloading stress. For example, wellbores experience temperatures varying from ambient at surface to in excess of 150° C. (302° F.), and hydraulic pressures up to 137.9 MPa (20,000 psi). These conditions may increase both thermal and mechanical strains on the polymer composite slickline cable, which make it possible for wellbore fluids (e.g., hydrocarbon fluids or gases, water, etc.) to penetrate fiber-reinforced composite based slickline cables, and the like, causing delamination or crack-based structural defects in the cable. Catastrophic failure of the slickline cable will occur when its effective loading capability is lower than the applied loading tensile strain.

Since a slickline cable is reused multiple times throughout its lifetime, it is common to monitor the structural integrity of the slickline cable, which may be particularly difficult to do since slickline cables often extend up to and surpass 30,000 feet in length. Traditional non-destructive techniques to inspect and determine slickline cable integrity include laser ultrasonic, thermography, microwave, terahertz, radio frequency (RF), eddy current, and x-ray radiography techniques. Such non-destructive inspections, however, only analyze surface defects, or result in only a representative portion of the slickline cable being evaluated, and not the entire length of the cable. Moreover, traditional non-destructive inspections are more adequate in laboratory settings, rather than in field use.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 3A-3C are progressive views of fabricating the composite slickline cable of FIG. 2B.

FIGS. 4A-4C are schematic diagrams of three exemplary embodiments that facilitate self-diagnosis of a composite slickline cable.

DETAILED DESCRIPTION

The present disclosure is related to equipment used during subterranean formation operations and, more particularly, to a composite slickline cable including optical fibers that enable functionality diagnostics for reliable subterranean operations and services.

The embodiments disclosed herein describe composite slickline cables, also known as "slicklines," that enable self-diagnosis in monitoring the mechanical integrity of the composite slickline cable. The exemplary composite slickline cables may first incorporate both optical fibers and carbon fibers in a two-dimensional planar arrangement with a thermoplastic resin. The two-dimensional layer or sheet may then be spirally wrapped into a three-dimensional structure and thermally treated to form the composite slickline cable.

Functionality diagnostic testing or self-diagnosis of the composite slickline cables may be undertaken either actively or passively and determinable from light or electromagnetic radiation transmission loss measurements taken at a surface location. In one active diagnosis embodiment, for example, a first portion of the optical fibers embedded within a composite slickline cable may be in optical communication with a turnaround sub coupled to the distal end of the composite slickline cable. The turnaround sub may assist light transmission from the surface through the first portion of the optical fibers to return to the surface via a second portion of the optical fibers for active composite slickline cable diagnosis. In one passive diagnosis embodiment, the distal ends of a plurality of optical fibers embedded within a composite slickline cable may be exposed to thermal or blackbody radiation from a downhole environment. The thermal radiation may be transmitted to the surface via the plurality of optical fibers for passive composite slickline cable diagnosis. The signal power degradation received at the surface may be correlated with the structural integrity of the composite slickline cable. As will be appreciated, such self-diagnosis of the composite slickline cable may prove useful in preventing or otherwise predicting failure of the cable.

Figure 1:
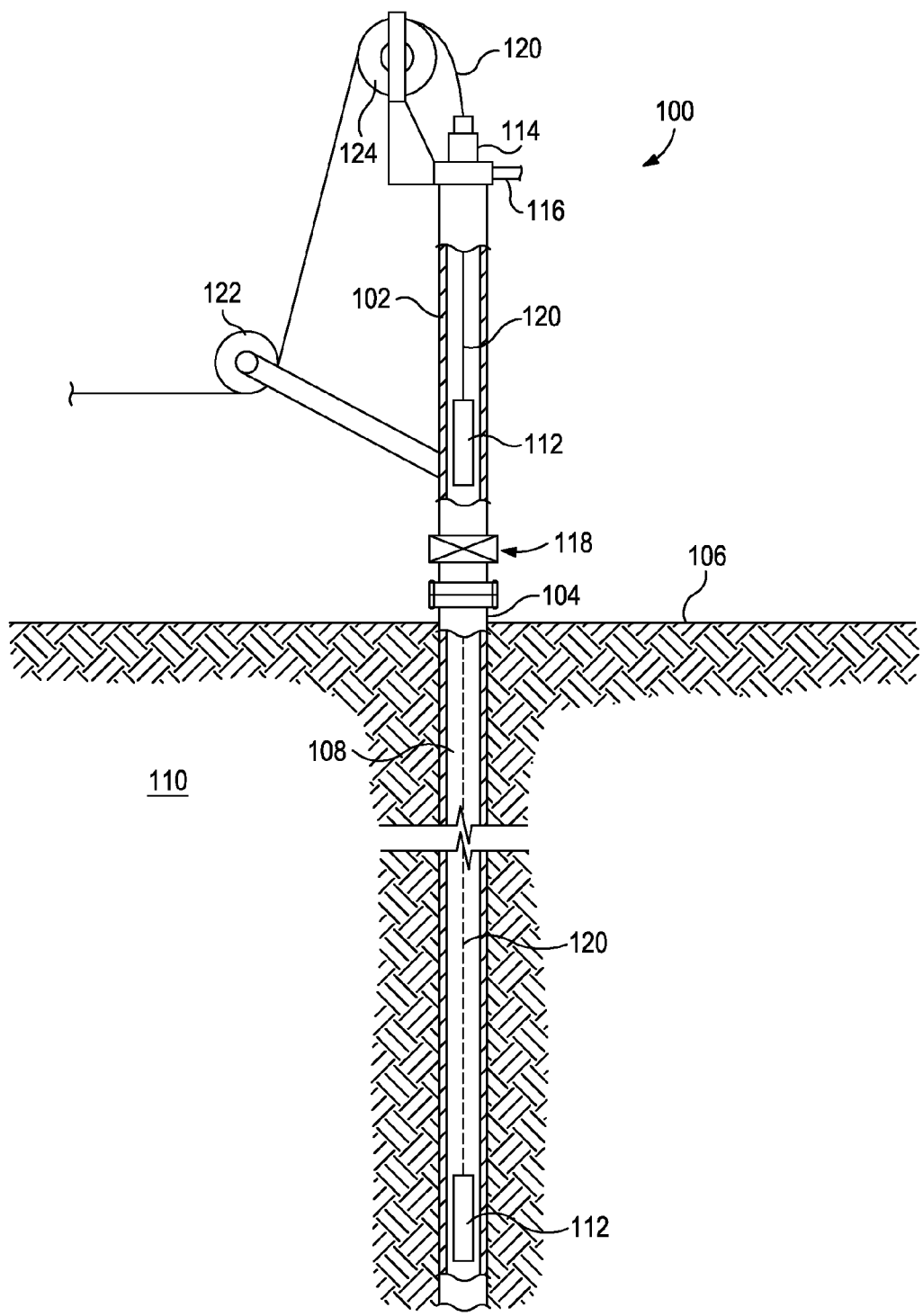
FIG. 1 is a schematic diagram of a wellbore system that may embody the principles of the present disclosure.

Referring to FIG. 1, illustrated is an exemplary wellbore that may embody one or more principles of the present disclosure, according to one or more embodiments. The system 100 may include a lubricator 102 operatively coupled to a wellhead 104 installed at the surface 106 of a wellbore 108. As illustrated, the wellbore 108 extends from the surface 106 and penetrates a subterranean formation 110 for the purpose of recovering hydrocarbons therefrom. While shown as extending vertically from the surface 106 in FIG. 1, it will be appreciated that the wellbore 108 may equally be deviated, horizontal, and/or curved over at least some portions of the wellbore 108, without departing from the scope of the disclosure. The wellbore 108 may be cased, open hole, contain tubing, and/or may generally be characterized as a hole in the ground having a variety of cross-sectional shapes and/or geometries as are known to those of skill in the art. Furthermore, it will be appreciated that embodiments disclosed herein may be employed in onshore or offshore wells.

The lubricator 102 may be coupled to the wellhead 104 using a variety of known techniques, such as a clamped or bolted connection. Moreover, additional components (not shown), such as a tubing head and/or adapter, may be positioned between the lubricator 102 and the wellhead 104. The lubricator 102 may be an elongate, high-pressure pipe or tubular that provides a means for introducing a downhole tool 112 into the wellbore 108 in order to undertake a variety of servicing operations within the wellbore 108. The top of the lubricator 102 may include a stuffing box 114 fluidly coupled to a high-pressure grease-injection line 116 used to introduce grease or another type of sealant into the stuffing box 114 in order to generate a seal. The lower part of the lubricator 102 may include one or more valves 118, such as an isolating valve or swab valve.

A composite slickline cable 120 may be extended into the lubricator 102 via the stuffing box 114 and attached at one end to the downhole tool 112. As used herein, the term "slickline cable" is meant to also refer to wireline, wireline cable, or any derivative thereof. Accordingly, the embodiments described herein are equally applicable to wireline cable, without departing from the scope of the present disclosure. The composite slickline cable 120 provides a conveyance means used to transport the downhole tool 112 into the wellbore 108 such that the desired wellbore servicing operations can be undertaken. The composite slickline cable 120 is generally fed to the lubricator 102 from a spool or drum (not shown) and through one or more sheaves 122, 124 before being introduced into the stuffing box 114 which provides a seal about the composite slickline cable 120 as it slides into the lubricator 102. Those skilled in the art will readily recognize that the arrangement and various components of the lubricator 102 and the wellhead 104 are described merely for illustrative purposes and therefore should not be considered limiting to the present disclosure. Rather, many variations of the lubricator 102 and the wellhead 104 may be had, without departing from the scope of this disclosure.

Figure 2A:
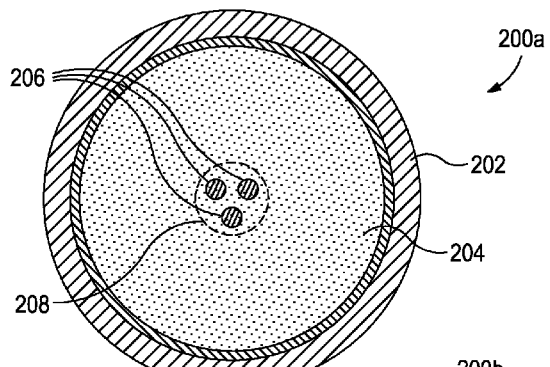
FIGS. 2A-2C are cross-sectional end views of three composite slickline cables.
Figure 2B:
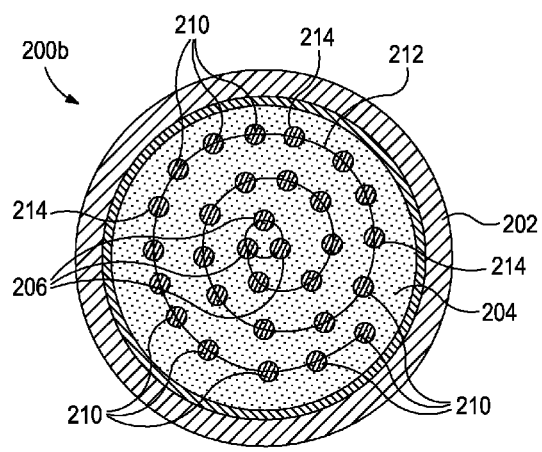
Figure 2C:
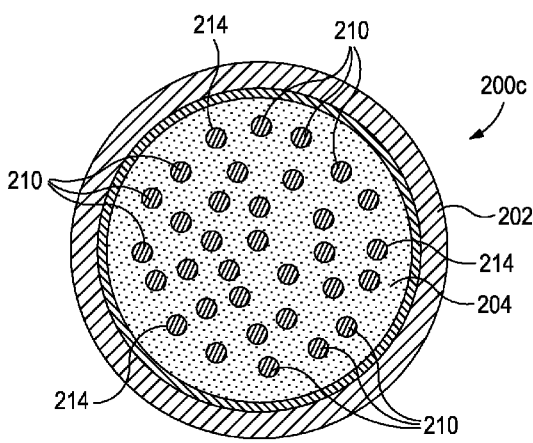

Referring now to FIGS. 2A-2C, illustrated are cross-sectional end views of three exemplary composite slickline cables, according to embodiments of the present disclosure. More particularly, FIG. 2A depicts a cross-sectional end view of a first composite slickline cable 200a, FIG. 2B depicts a cross-sectional end view of a second composite slickline cable 200b, and FIG. 2C depicts a cross-sectional end view of a third composite slickline cable 200c. Each of the composite slickline cables 200a-c may be similar to or the same as the composite slickline cable 120 of FIG. 1 and, therefore, may each be referred to as a slickline and otherwise configured to convey the downhole tool 112 into the wellbore 108, as generally described above.

As illustrated in FIG. 2A, the first composite slickline cable 200a includes a sheath 202 disposed about a polymer composite 204. The sheath 202 acts as a protective coating for the polymer composite 204 to mitigate damage to the polymer composite 204 or components thereof during operation. In some instances, however, the sheath 202 may be excluded from the composite cable 200, without departing from the scope of this disclosure.

The sheath 202 may be made of a metal material or another polymer with better performance with respect to properties including anti-wearing, hermetical sealing, and high mechanical strength. Non-limiting examples of metal materials suitable for use in the sheath 202 may include stainless steel, aluminum, copper, and their alloy compositions. Non-limiting examples of polymers suitable for use in the sheath 202 may include polyolefins, polytetrafluoroethylene-perfluoromethylvinylether polymer (PTFE-MFA), perfluoro-alkoxyalkane polymer (PFA), polytetrafluoroethylene polymers (PTFE, e.g., TEFLON®), ethylene-tetrafluoroethylene polymers (ETFE), ethylene-propylene copolymers (EPC), polysulfone (PSF), polyethersulfone (PES), polyarylether ketone polymers (PAEK), polyetherether ketone (PEEK), polyphenylene sulfide polymers (PPS), modified polyphenylene sulfide polymers, polyether ketone polymers (PEK), maleic anhydride modified polymers, perfluoroalkoxy polymers, fluorinated ethylene propylene polymers, polyvinylidene fluoride polymers (PVDF), polytetrafluoroethylene-perfluoromethylvinylether polymers, polyamide polymers, polyimide polymers, polyurethane, thermoplastic polyurethane, ethylene chloro-trifluoroethylene polymers, chlorinated ethylene propylene polymers, self-reinforcing polymers based on a substituted poly(1,4-phenylene) structure where each phenylene ring has a substituent R group derived from a wide variety of organic groups, and the like, and any combination thereof.

In some instances, the aforementioned polymers alone may not have sufficient mechanical strength and wearing properties to withstand high pull or compressive forces as the composite slickline cable 200a is pulled, for example, through the stuffing box 114 (FIG. 1) while being run downhole. As such, the polymer material of the sheath 202 may, in some embodiments, further include reinforced continuous or non-continuous fibers to increase mechanical strength and wearing properties. While any suitable fibers may be used to provide mechanical strength properties sufficient to withstand such forces, exemplary fibers include, but are not limited to, carbon fibers, fiberglass, ceramic fibers, aramid fibers, metallic filaments, liquid crystal aromatic polymer fibers, quartz, carbon nanotubes, and the like, and any combination thereof. Metallic fibers and filaments may, in some instances, be composed of materials such as iron, aluminum, cobalt, nickel, tungsten, and the like, and any combination thereof.

The polymer composite 204 may comprise a polymer matrix with a plurality of fibers embedded therein to provide desirable mechanical strength. Non-limiting examples of materials suitable for use as the polymer matrix of the polymer composite 204 may include thermoplastic or thermoset resins including polyolefins, PTFE-MFA, PFA, PTFE, ETFE, EPC, poly(4-methyl-1-pentene), other fluoropolymers, PSF, PES, PAEK, PEEK, PPS, modified polyphenylene sulfide polymers, PEK, maleic anhydride modified polymers, perfluoroalkoxy polymers, fluorinated ethylene propylene polymers, PVDF, polytetrafluoroethylene-perfluoromethylvinylether polymers, polyamide polymers, polyurethane, thermoplastic polyurethane, ethylene chlorotrifluoroethylene polymers, chlorinated ethylene propylene polymers, self-reinforcing polymers based on a substituted poly(1,4-phenylene) structure where each phenylene ring has a substituent R group derived from a wide variety of organic groups, and the like, and any combination thereof. In one embodiment, the preferred polymer material has high percentage of crystalline structure. In another embodiment, the preferred polymer material has high glass transition temperature. In the other embodiment, the preferred polymer material has high melting point temperature.

Non-limiting examples of continuous or non-continuous fibers suitable for use in the polymer composite 204 may include carbon fibers, silicon carbide fibers, aramid fibers, glass fibers, ceramic fiber, metal filaments, carbon nanotubes, and the like, and any combination thereof. In one embodiment, these fibers may have a length ranging from few millimeters to a few meters. In another embodiment, these fibers may be from a few meters to a few hundred meters. To maintain uniform mechanical strength of the full slickline cable, the heads of the fiber connections at a specific section of the cable may be kept constant. Metallic fibers and filaments may, in some instances, be composed of materials such as iron, aluminum, cobalt, nickel, tungsten, and the like, and any combination thereof. These materials are dispersed uniformly inside the polymer matrix.

In some embodiments, the composite slickline cable 200a may further include one or more energy transmission lines 206 (three shown) embedded within the polymer composite 204 and extending along all or a portion of the length of the composite slickline cable 200a. The energy transmission lines 206 may be electrical transmission lines, acoustic channels, and/or optical fiber strands, and may be useful for facilitating power transmission downhole, communicating between a wellbore tool and a surface location, and obtaining distributed temperature or seismic measurements along the length of the energy transmission lines 206. In the illustrated embodiment, the energy transmission lines 206 are optical fibers used to obtain downhole condition measurements. More particularly, one of the energy transmission lines 206 may be a single-mode optical fiber used for telemetry purposes in communicating signals between a downhole location and a surface location, two energy transmission lines 206 may be multi-mode optical fibers that can be used for distributed temperature sensing along a wellbore, and the remaining optical fibers may be used for cable structural integrity monitoring by measuring distributed acoustic or dynamic strain signals. In another embodiment, the additional energy transmission lines may be used to provide power for downhole tool in-situ formation fluid analyses.

In some instances, the energy transmission lines 206 may have a coating or a covering disposed thereabout (e.g., a thermoplastic material, a thermoset material, a metal, carbon fiber, or the like). Such coatings or coverings may assist in adhesion of the energy transmission lines 206 with the polymer composite 204. In other embodiments, the energy transmission lines 206 may each be sealed and otherwise loosely housed within a hollow or "loose" tube 208 positioned at or near the centerline of the composite slickline cable 200a and otherwise embedded within the polymer composite 204. The loose tube 208 provides an elongated housing for the energy transmission lines 206 but also isolates the energy transmission lines 206 from tensile stresses or strains that may be assumed by the polymer composite 204. As a result, the energy transmission lines 206 are able to avoid signal attenuation and data infidelity during downhole tool tensional loading that might otherwise damage or sever the optical fibers. In another embodiment, such a loose tube 208 also provides strain-free protection to an optical fiber for high fidelity data transmission.

Referring to FIG. 2B, the second composite slickline cable 200b may be similar in some respects to the first composite slickline cable 200a and therefore may be best understood with reference thereto, where like numerals represent like elements not described again. For instance, the second composite slickline cable 200b may include the sheath 202, the polymer composite 204, and the energy transmission lines 206 positioned within the polymer composite 204. The second composite slickline cable 200b, however, may also include a plurality of integrity-sensing optical fibers 210 embedded within the polymer composite 204. In the illustrated embodiment, the integrity-sensing optical fibers 210 in FIG. 2B are depicted as being coupled to or otherwise embedded in a polymer matrix sheet 212. When making a cylindrical cable with such a two-dimensional layered material, the optical fibers will be circularly wrapped around the cable cross-section with a spiral pattern. In some embodiments, the energy transmission lines 206 may be omitted from the second composite slickline cable 200b and the downhole distributed temperature measurements and telemetry operations discussed above may alternatively be undertaken by one or more of the integrity-sensing optical fibers 210.

The polymer matrix sheet 212 may comprise a thermoplastic matrix with laminated layers. The polymer matrix sheet 212 may be made of a polymer matrix selected from the listing of materials above with reference to the polymer composite 204. In some embodiments, the polymer matrix sheet 212 may further include a plurality of fibers embedded therein to enhance strength. Suitable continuous or non-continuous fibers for use in the polymer matrix sheet 212 include those listed above with reference to the polymer composite 204. In addition, suitable fibers for use in the reinforced polymer composite material for the polymer matrix sheet 212 may exhibit a high glass transition temperature and/or melting point temperature.

The third composite slickline cable 200c in FIG. 2C may also be similar in some respects to the first composite slickline cable 200a and, therefore, may include the sheath 202 and the polymer composite 204. Similar to the second composite slickline cable 200b, the third composite slickline cable 200c may include the plurality of the integrity-sensing optical fibers 210. Unlike the second composite slickline cable 200b, however, the integrity-sensing optical fibers 210 of the third composite slickline cable 200c may be arranged in a random pattern as embedded within the polymer composite 204.

It is noted that the energy transmission lines 206 are omitted from the third composite slickline cable 200c and, therefore, the downhole distributed temperature measurements and telemetry operations may alternatively be undertaken by one or more of the integrity-sensing optical fibers 210. In other embodiments, however, the energy transmission lines 206 may nonetheless be included in the third composite slickline cable 200c, without departing from the scope of the disclosure.

Still referring to FIGS. 2B and 2C, the integrity-sensing optical fibers 210 may be low-transmission loss optical fibers that are either single-mode or multi-mode and exhibit a transmission bandwidth from about 600 nm to about 2200 nm with its lowest loss bandwidth ranging from about 1000 nm to about 1600 nm. In at least one embodiment, one or more of the integrity-sensing optical fibers 210 may exhibit a gradient refractive index (e.g., graded index) across its fiber core to ensure light transmission is strongly guided by the fiber core path that may ensure bending insensitivity and low transmission loss.

In some embodiments, each integrity-sensing optical fiber 210 may have a coating or a cladding 214 disposed thereon or otherwise encapsulating the integrity-sensing optical fiber 210. The cladding 214 may be a high-temperature coating made of, for example, a thermoplastic material, a thermoset material, a metal, an oxide, carbon fiber, or any combination thereof. In other embodiments, the cladding 214 may be a single-layer carbon coating, or a carbon and polyimide dual-layer coating. The cladding 214 may prove useful for a variety of purposes. For instance, the cladding 214 may improve the mechanical bonding strength of the integrity-sensing optical fibers 210 to the polymer composite 204 and/or the polymer matrix sheet 212. The cladding 214 may also help reduce thermal expansion mismatch between the integrity-sensing optical fibers 210 and the materials of the polymer composite 204 and/or the polymer matrix sheet 212, and thereby effectively transfer axial loads to the fibers embedded within the polymer composite 204 and/or the polymer matrix sheet 212. The cladding 214 may further provide a hermetic seal that protects the integrity-sensing optical fibers 210 from moisture and/or hydrogen that might induce artificial signal attenuation by hydroxyl ion absorption.

Referring now to FIGS. 3A-3C, illustrated are progressive views of fabricating the second composite slickline cable 200b of FIG. 2B, according to one or more embodiments. FIG. 3A illustrates an isometric view of a portion of the polymer matrix sheet 212 with a plurality of integrity-sensing optical fibers 210 embedded therein. The image above the isometric view provides a top view of the two-dimensional polymer matrix sheet 212 and associated integrity-sensing optical fibers 210 as embedded therein. The polymer matrix sheet 212 may exhibit a thickness 302 that may vary depending on the application. For instance, in at least one embodiment, the thickness 302 may range between about 0.3 mm to about 1.0 mm. In other embodiments, however, the thickness 302 may be greater than 1.0 mm, without departing from the scope of the disclosure. The polymer matrix sheet 212 may exhibit a length 304 of any desired length, depending principally on the capabilities of known manufacturing techniques.

In some embodiments, the integrity-sensing optical fibers 210 may be axially aligned and otherwise parallel to each other as they are embedded into the polymer matrix sheet 212 during manufacturing. The spacing between adjacent integrity-sensing optical fibers 210 may be uniform or non-uniform, without departing from the scope of the disclosure. In some embodiments, as illustrated, the length of the integrity-sensing optical fibers 210 may be longer than the length 304 of the polymer matrix sheet 212. As will be appreciated, the additional length of the integrity-sensing optical fibers 210 may prove advantageous in connecting the integrity-sensing optical fibers 210 to additional optical fibers, especially if a closed loop application is preferred.

In FIG. 3B, the polymer matrix sheet 212 is shown as being wound or otherwise wrapped into a spiral configuration or design. Accordingly, the two-dimensional polymer matrix sheet 212 of FIG. 3A may be spirally wrapped into a three-dimensional structure, as shown in FIG. 3B. This process may be undertaken while embedding the polymer matrix sheet 212 into the polymer composite 204 (FIGS. 2A-2C) and while maintaining the polymer matrix sheet 212 at a temperature that is equal to or higher than the glass transition temperature (Tg) or thermoplastic melting temperature of the materials that make up the polymer matrix sheet 212. Exemplary glass transition and melting temperatures for some suitable materials that may be used for the polymer matrix sheet 212 are provided in Table 1 below:

TABLE 1

| Polymeric Matrix Material | Tg (° C.) | Melting Temperature (° C.) |
|---|---|---|
| PPS | 90 | 285 |
| PSF | 190 | Amorphous |
| PES | 225 | Amorphous |
| PAEK | 138 | 320-380 |
| PEEK | 145 | 335 |
| PI | 320 | 385 |

Upon cooling, a fully integrated cable structure results. In FIG. 3C, the completed second composite slickline cable 200b is shown having a total length 306, and including the sheath 202 and the polymer composite 204. As indicated above, the length 306 of the second composite slickline cable 200b could theoretically be any length and is limited primarily by the corresponding manufacturing process. In some embodiments, however, the length 306 for a particular application or job may range between about 10,000 ft. and about 30,000 ft. In another embodiment, the second composite slickline cable 200b may be made by wrapping the polymer matrix sheet 212 with embedded integrity-sensing optical fibers 210 and reinforced fibers with an energy conductor core, such as a copper wire(s). This fabrication process may be undertaken, at least in part, by continuously drawing the molded cable from a manufacturing furnace.

While FIGS. 3A-3C generally depict the fabrication process for the second composite slickline cable 200b, the aforementioned molding process may alternatively produce a cylindrical cable with randomly-distributed integrity-sensing optical fibers 210, similar to the third composite slickline cable 200c of FIG. 2C. In such an embodiment, the continuous molding process may integrate both the continuous or non-continuous fibers and the integrity-sensing optical fibers 210 into the polymer composite 204 while maintaining the polymer composite 204 above its glass transition temperature. The resulting cable structure may include randomly distributed integrity-sensing optical fibers 210, as generally depicted in FIG. 2C. Moreover, the energy transmission lines 206 of FIG. 2B may be incorporated using either manufacturing technique described herein, without departing from the scope of this disclosure.

Referring now to FIGS. 4A-4C, with continued reference to the prior figures, illustrated are three exemplary embodiments of composite slickline cables 400a-c that facilitate self-diagnosis, according to the present disclosure. The composite slickline cables 400a-c may each be similar to or the same as either of the second or third slickline cables 200b,c of FIGS. 2B and 2C, respectively. Accordingly, the composite slickline cables 400a-c may each include the sheath 202 that encloses the polymer composite 204 (not shown) and a plurality of integrity-sensing optical fibers 210 extending along the length of the composite slickline cables 400a-c. Moreover, each composite slickline cable 400a-c may have a surface end 401a and a distal end 401b, where the surface end 401a is disposed at a surface location (e.g., a rig floor, the wellhead 104 of FIG. 1, etc.), and the distal end 401b is configured to be extended into a wellbore (e.g., the wellbore 108 of FIG. 1).

Referring first to FIG. 4A, the first composite slickline cable 400a may be suitable for use in active self-diagnosis. To facilitate active self-diagnosis, electromagnetic radiation 402 may be provided to the first composite slickline cable 400a at the surface end 401a. More particularly, the electromagnetic radiation 402 may be provided into a first portion 404a (e.g., half) of the integrity-sensing optical fibers 210 at the surface end 401a. As illustrated, the electromagnetic radiation 402 may be provided by an electromagnetic radiation source 406. The electromagnetic radiation source 406 may include, but is not limited to, ambient light, a light bulb, a light emitting diode (LED), a laser, a blackbody radiator source, a supercontinuum source, combinations thereof, or the like. Accordingly, the electromagnetic radiation 402 may include, but is not limited to, radio waves, microwave radiation, terahertz, infrared and near-infrared radiation, visible light, ultraviolet light, X-ray radiation, and gamma ray radiation.

In some embodiments, an optical reflector 408 may be coupled to the distal end 401b of the first composite slickline cable 400a. The optical reflector 408 may be configured to seal the distal end 401b of the first composite slickline cable 400a and provide a means for reflecting the electromagnetic radiation 402 from the first portion 404a of the cable integrity-sensing optical fibers 210 to a second portion 404b (e.g., the other half) of the cable integrity-sensing optical fibers 210. In some embodiments, the optical reflector 408 may be an optical prism that includes at least two 90° reflections that redirect the electromagnetic radiation 402 received from the first portion 404a back toward the surface location via the second portion 404b.

At the surface end 401a, a detector 410 may be positioned to sense and otherwise monitor the intensity of the returning electromagnetic radiation 402 for power analysis. The detector 410 is an optical transducer. The detector 410 may be, but is not limited to, a thermal detector (e.g., a thermopile or photoacoustic detector), a semiconductor detector, a piezoelectric detector, a charge coupled device (CCD) detector, a photodetector, a video or array detector, a split detector, a photon counter detector (such as a photomultiplier tube), any combination thereof, or any other detectors known to those skilled in the art. Signal analysis equipment associated with the detector may include a standard optical spectral analyzer having a processor for processing, storing in memory, and displaying to a user the detected results. The signal analysis equipment is capable of converting the received signals into an electronic signal, such as a high-speed linear photodetector array, a CCD array, or a CMOS array. In some embodiments, the processor may be provided with a user interface for input and control, such as by generating reports and performing fast Fourier transform analyses.

In another embodiment, the optical reflector 408 may be omitted from the first composite slickline cable 400a and instead the distal end of each integrity-sensing optical fiber 210 may be coated with a reflective coating to enhance end reflectivity. In some embodiments, the distal end of each integrity-sensing optical fiber 210 may be coated using vacuum or chemical deposition coating processes. In such embodiments, the electromagnetic radiation 402 may be provided to all of the integrity-sensing optical fibers 210 and conveyed to the distal end of the composite slickline cable 400. At the distal end of each integrity-sensing optical fiber 210, the electromagnetic radiation 402 may be reflected back toward the surface location to be received by the detector 410. At the surface end 401a, the first composite slickline cable 400a may include or otherwise incorporate a bi-directional 1×N optical coupler (N=2, 3, 4, . . . , ) (not shown) that allows the integrity-sensing optical fibers 210 to both send and receive electromagnetic radiation 402. The reflected signals from the integrity-sensing optical fibers 210 are analyzed by the detector 410 for cable operation condition analysis.

In either embodiment, the electromagnetic radiation 402 measured by the detector 410 may be correlated to the structural integrity of the first composite slickline cable 400a. More particularly, a structural defect in the first composite slickline cable 400a, such as a crack or delamination, may result in the breakage of one or more of the integrity-sensing optical fibers 210, which may lead to signal or power loss as detected by the detector 410. Such signal or power loss may be step-like, and continuous or increasing loss of the signal will eventually meet a predetermined threshold that corresponds to a catastrophic failure event when the first composite slickline cable 400a is severed or otherwise unsuitable for continuous downhole logging service use.

As will be appreciated, the loss of electromagnetic radiation 402 from a given integrity-sensing optical fiber 210 may be indicative of the location of a structural defect in the first composite slickline cable 400a. Briefly, due to the optical properties of optical fibers, a defect (e.g., break) in the given integrity-sensing optical fiber 210 may cause a backscattering of the electromagnetic radiation 402 that may be detected by the detector 410. The sharp transmission loss jump of the backscattered electromagnetic radiation 402, measured from a time-domain optical reflectometer, provides information that may be used to determine the location in the given integrity-sensing optical fiber 210 where the anomalous signal loss originated. Since the speed of light is constant, the distance from the surface to the point where the backscatter originated can also be readily determined when the effective refractive index of the combined fiber core and cladding is known (e.g., about 1.468 at 1550 nm). Accordingly, a signal loss from a given integrity-sensing optical fiber 210 as measured by the detector 410 may indicate the axial position of a defect in the first composite slickline cable 400a. Moreover, a signal loss from a given integrity-sensing optical fiber 210 as measured by the detector 410 may also indicate the radial or angular position of a defect along the circumference of the first composite slickline cable 400a when these optical fibers are arranged in a regularly patterned geometry as a function of cross-sectional area.

Referring now to FIG. 4B, the second composite slickline cable 400b may be designed for passive self-diagnosis. As extended downhole within a wellbore (not shown), the distal end 401b of the second composite slickline cable 400b may be exposed to the wellbore environment, which can exhibit temperatures in excess of 200° C. Such temperatures may allow distal end components to radiate thermal energy that can be detected by the detector 410 (e.g., a thermopile detector) at the surface for total thermal energy detection. In some embodiments, the integrity-sensing optical fibers 210 may be exposed to the thermal emission electromagnetic radiation 402 from downhole and configured to convey the same to the detector 410 for thermal energy analysis.

In other embodiments, however, the second composite slickline cable 400b may include a thermal radiation cap 412, with an emissivity coefficient of ~1, coupled to its distal end 401b and otherwise receiving the distal ends of the integrity-sensing optical fibers 210. The thermal radiation cap 412 may be made of a blackbody matt or a block made from carbon fibers, for example, and configured to receive and radiate the electromagnetic radiation 402 into the integrity-sensing optical fibers 210 for detection at the surface by the detector 410. A decrease in the electromagnetic radiation 402 as detected by the detector 410 may be indicative of the breakage of one or more of the integrity-sensing optical fibers, which, in turn, may be indicative of cracks and/or delaminations along the axial length of the second composite slickline cable 400b. Again, the loss of electromagnetic radiation 402 from a given integrity-sensing optical fiber 210 may be indicative of the axial and/or radial position of a defect along the length/circumference of the second composite slickline cable 400b. In some embodiments, the integrity-sensing optical fibers 210 may be exposed to the electromagnetic radiation 402 and configured to convey the same to the detector 410 for energy spectrum analysis.

Referring to FIG. 4C, the third composite slickline cable 400c may also be suitable for use in active self-diagnosis. Accordingly, similar to the embodiment of FIG. 4A, the third composite slickline cable 400c may receive electromagnetic radiation 402 from the electromagnetic radiation source 406 at the surface end 401a, when the optical fibers are arranged in a known patterned geometry. As illustrated, a multi-fiber turnaround sub 414 may be coupled to the distal end 401b of the composite slickline cable 400 to provide a looped-transmissive optical fiber path from each pair of optical fibers. More particularly, the multi-fiber turnaround sub 414 may be configured to connect several pairs of the integrity-sensing optical fibers 210 via a 180° bend such that the electromagnetic radiation 402 can be conveyed downhole via one or more first integrity-sensing optical fibers 210 and transmitted to one or more second integrity-sensing optical fibers 210 via the multi-fiber turnaround sub 414. The two sets of integrity-sensing optical fibers 210 provide several pairs of integrity-sensing optical fibers 210 that transmit the electromagnetic radiation back to the surface end 401a for detection by the detector 410. In some embodiments, the multi-fiber turnaround sub 414 may be based on several MINIBEND™ fiber optic components available through AFL of Duncan, S.C., USA.

As will be appreciated, the embodiment of FIG. 4C may prove advantageous in enabling crack location identification along the length and circumference of the third composite slickline cable 400c. More particularly, this embodiment may assign optically coupled pairs of integrity-sensing optical fibers 210 into a specific pattern across the cross-section of the third composite slickline cable 400c. Each pair of integrity-sensing optical fibers 210 may be used for self-diagnosis purposes at the known radial position about the circumference of the third composite slickline cable 400c. As a result, a well operator may be apprised of the specific angular location about the circumference of the third composite slickline cable 400c where a defect (e.g., a crack or delamination) may be present. If the electromagnetic radiation 402 received from a particular pair of integrity-sensing optical fibers 210 becomes dim or broken, as sensed by the detector 410, the well operator is then able to determine the location of the defect.

Referring generally to the embodiments of FIGS. 4A-4C, a gradual loss in power, as measured by the detector 410, may also indicate darkening of the composite slickline cables 400a-c due to hydrogen darkening. As known to those skilled in the art, hydrogen darkening can be detrimental to the operation of optical fibers. According to the present disclosure, the integrity-sensing optical fibers 210 may be used as early warning indicators that can indicate when the energy transmission lines 206 (FIGS. 2A-2C) fall below a useful threshold, such as at a particular optical wavelength band of interest. Once the energy transmission lines 206 fall below the particular optical wavelength band of interest, the composite slickline cable 400a-c may require replacement. To justify if the transmission loss is due to hydrogen invasion or defect effect, the time-dependent received power signal trend could give a strong indication. In one embodiment, for example, the transmission signal loss may continuously degrade, which may be indicative of hydrogen-induced darkness effect. In another embodiment, the measured signal trend may exhibit a stepwise degradation, which may be indicative of a fiber breakage event.

In some embodiments, some integrity-sensing optical fibers 210 may be coated with a hermetic carbon coating (e.g., cladding 214 of FIGS. 2B and 2C), while other integrity-sensing optical fibers 210 may be coated with a non-carbon hermetic coating (e.g., cladding 214). The non-carbon coated integrity-sensing optical fibers 210 may be characterized as sacrificial fiber sensors that will experience the onset of hydrogen ingress before the same can be detected by the carbon coated integrity-sensing optical fibers 210. Accordingly, signals detected from each group of integrity-sensing optical fibers 210 may be differentiated to detect the ingress of hydrogen.

In other embodiments, multiple optical wavelengths may be used, simultaneously, to differentiate between hydrogen-induced narrow band loss and physical microbend loss. For example, hydrogen "gas-in-glass" $H_2$ has a relatively large absorption cross-section ranging from about 1380 nm to about 1420 nm, and peaking at about 1400 nm and again from about 1520 nm to about 1700 nm within the near infrared optical transmission bands in silica fiber. At elevated temperatures, hydroxyl losses of SiOH and GeOH grow large at 1383 nm (also referred to as "water peak") and at about 1410 nm. Due to the elevated propensity to hydroxyl formation in germanium-doped optical fibers, the use of "pure core" (non-Ge-doped) optical fibers limits hydroxyl species formation to SiOH. Pure core un-doped optical fibers will have dramatically reduced transmission loss as compared with Ge-doped fibers.

However, shrinkage-induced micro-bend losses due to cold temperature shrinkage of the composite slickline cable 400a-c are mostly independent of optical probe wavelength. For example, for micro-bend loss determination, an optimal probe wavelength may be at the shortwave side of the long distance transmission spectrum, such as between about 990 nm and about 1070 nm, where hydrogen losses do not appear.

In some embodiments, one or more of the integrity-sensing optical fibers 210 may have added thereto hydrogen-induced Fiber Bragg Gratings that provide a frequency shift that indicates location of signal loss. Fiber Bragg Gratings are susceptible to hydrogen-induced wavelength shift of about a few picometers wavelength shift per atmosphere of $H_2$ gas-in-glass species. By having Fiber Bragg Gratings sealed in a hermetic coating layer or without such a layer, it is possible to detect hydrogen-induced difference from the measured strain and temperature values as a function of time. Another method is to use an Optical Time Domain Reflectometer (OTDR) by sending a train of short duration laser pulses that individually undergo Rayleigh backscatter continuously along the fiber length. Backscattered pulse intensity is detected and timed with respect to gate time and, therefore, the distance to various loss features (e.g., defects) along the fiber transmission path can be ranged or otherwise located and identified as being non-reflective (point loss), reflective with loss, reflective without loss, loss slope, end-of fiber, etc. The slope of the transmission loss could be anomalously increased by potential hydrogen-induced darkness effects.

Additionally, there is Optical Frequency Domain based backscatter Reflectometry (OFDR), which employs a swept subcarrier amplitude modulation to detect, range, and identify events along the integrity-sensing optical fibers 210. Any defect-induced local strain variation in the integrity-sensing optical fibers 210 will lead to a localized refractive index variation, which can be detected by an optical transmission loss signature that shows the location and severity of the localized strain effect on the fiber refractive index.

Figure 5:
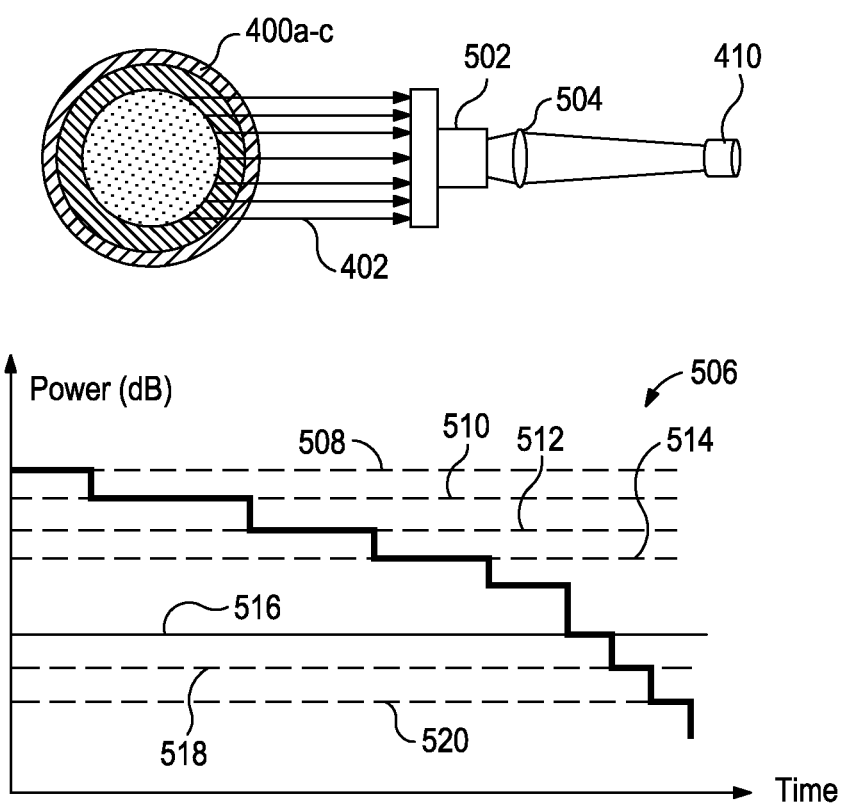
FIG. 5 is a schematic of a detector setup for receiving electromagnetic radiation from a composite slickline cable and a corresponding plot that indicates exemplary power loss over time as a result of a decreasing number or intensity of operating integrity-sensing optical fibers.

Referring now to FIG. 5, with continued reference to FIGS. 4A-4C, gradual loss in signal power, as measured by the detector 410, may indicate that the composite slickline cable 400*a-c* may need to be repaired or otherwise replaced. In FIG. 5, an optical coupler 502 is shown as receiving electromagnetic radiation 402 from one of the composite slickline cables 400*a-c*. An optical lens 504 may direct the electromagnetic radiation 402 to the detector 410 for power analysis. In the plot 506 below, the detected power (e.g., the y-axis) is shown as gradually decreasing over time as the number of operating integrity-sensing optical fibers 210 decreases. As discussed above, this loss in power could be attributed to defects in the composite slickline cable 400*a-c*, which might break the integrity-sensing optical fibers 210, or from the ingress of hydrogen, which decreases the amount of power that can be transmitted through the integrity-sensing optical fibers 210.

At the outset of operation, the composite slickline cable 400*a-c* may have "n" integrity-sensing optical fibers 210, as shown at 508 in the plot. Over time as the composite slickline cable 400*a-c* is in service, the number or intensity of operable integrity-sensing optical fibers 210 decreases, such as at 510, 512, and 514. As a result, the detected power correspondingly decreases. Eventually the detected power may reach a predetermined failure threshold 516 where the composite slickline cable 400*a-c* may fail or otherwise be considered unsuitable for use. At that point, there may be only a few or limited operable integrity-sensing optical fibers 210 left in the composite slickline cable 400*a-c*, as indicated at 518 and 520.

Embodiments disclosed herein include:

A. A downhole slickline cable that includes a polymer matrix having reinforcing fibers embedded therein, and a plurality of integrity-sensing optical fibers embedded within the polymer composite and extending along an axial length of the downhole slickline cable.

B. A system that includes a downhole slickline cable having a surface end, a distal end, and comprising a polymer composite and a plurality of integrity-sensing optical fibers embedded within the polymer composite, wherein the plurality of integrity-sensing optical fibers extends along an axial length of the downhole slickline cable, and a detector arranged at the surface end to receive electromagnetic radiation from the plurality of integrity-sensing optical fibers.

C. A method that includes conveying a downhole slickline cable into a wellbore, the downhole slickline cable having a surface end, a distal end, and comprising a polymer composite and a plurality of integrity-sensing optical fibers embedded within the polymer composite, wherein the plurality of integrity-sensing optical fibers extends along an axial length of the downhole slickline cable, receiving electromagnetic radiation from the plurality of integrity-sensing optical fibers with a detector arranged at the surface end, processing the electromagnetic radiation received by the detector, and determining a mechanical and structural integrity of the downhole slickline cable based on an intensity of the electromagnetic radiation received by the detector.

Each of embodiments A, B, and C may have one or more of the following additional elements in any combination: Element 1: further comprising a sheath disposed about the polymer composite and being made of a metal or a polymer. Element 2: further comprising at least one energy transmission line positioned within the polymer composite. Element 3: wherein the at least one energy transmission line comprises one or more of the plurality of integrity-sensing optical fibers. Element 4: wherein the plurality of integrity-sensing optical fibers are embedded in a polymer matrix sheet arranged within the polymer composite. Element 5: wherein the polymer matrix sheet is arranged in a spiral pattern within the polymer composite. Element 6: wherein the polymer matrix sheet comprises a thermoplastic or thermoset resin selected from the group consisting of a polyolefin, polytetrafluoroethylene-perfluoromethylvinylether polymer, perfluoro-alkoxyalkane polymer, a polytetrafluoroethylene polymer, a ethylene-tetrafluoroethylene polymer, an ethylene-propylene copolymers, poly(4-methyl-1-pentene), polysulfone, polyethersulfone, a polyaryletherketone polymer, polyetherether ketone, a polyphenylene sulfide polymer, a modified polyphenylene sulfide polymer, a polyether ketone polymer, a maleic anhydride modified polymer, a perfluoroalkoxy polymer, a fluorinated ethylene propylene polymer, a polyvinylidene fluoride polymer, a polytetrafluoroethylene-perfluoromethylvinylether polymer, a polyamide polymer, polyurethane, thermoplastic polyurethane, an ethylene chloro-trifluoroethylene polymer, a chlorinated ethylene propylene polymer, a self-reinforcing polymer based on a substituted poly(1,4-phenylene) structure where each phenylene ring has a substituent Ft group derived from a wide variety of organic groups, any derivative thereof, and any combination thereof. Element 7: wherein the polymer matrix sheet includes reinforcing fibers embedded therein, and wherein the reinforcing fibers of the polymer matrix sheet are selected from the group consisting of carbon fibers, silicon carbide fibers, aramid fibers, glass fibers, ceramic fiber, metal filaments, nanotubes, any derivative thereof, and any combination thereof. Element 7: wherein the plurality of integrity-sensing optical fibers are randomly arranged as embedded within the polymer composite. Element 8: wherein one or more of the plurality of integrity-sensing optical fibers has a protection layer disposed thereon. Element 9: wherein the protection layer comprises a material selected from the group consisting of a thermoplastic, a thermoset, a metal, a carbon coating, a non-carbon coating, a carbon and polyimide dual-layer coating, any derivative thereof, and any combination thereof.

Element 10: further comprising one or more energy transmission lines positioned within the downhole slickline cable. Element 11: wherein the plurality of integrity-sensing optical fibers are embedded in a polymer matrix sheet arranged in a spiral pattern within the polymer composite. Element 12: wherein the plurality of integrity-sensing optical fibers are arranged randomly as embedded within the polymer composite. Element 13: wherein one or more of the plurality of integrity-sensing optical fibers has a cladding disposed thereon, the cladding being a material selected from the group consisting of a thermoplastic, a thermoset, a metal, a carbon coating, a non-carbon coating, a carbon and polyimide dual-layer coating, any derivative thereof, and any combination thereof. Element 14: further comprising an electromagnetic radiation source arranged at the surface end to provide the electromagnetic radiation to the plurality of integrity-sensing optical fibers. Element 15: further comprising an optical reflector coupled to the distal end of the downhole slickline cable. Element 16: wherein a distal end of each integrity-sensing optical fiber is coated with a reflective coating. Element 17: further comprising a multi-fiber turnaround sub coupled to the distal end of the downhole slickline cable and connecting one or more pairs of the plurality of integrity-sensing optical fibers. Element 18: further comprising a thermal radiation cap coupled to a distal end of the plurality of integrity-sensing optical fibers.

Element 19: further comprising providing the electromagnetic radiation to the plurality of integrity-sensing optical fibers with an electromagnetic radiation source arranged at the surface end. Element 20: wherein receiving the electromagnetic radiation from the plurality of integrity-sensing optical fibers comprises providing the electromagnetic radiation to a first portion of the plurality of integrity-sensing optical fibers with the electromagnetic radiation source, receiving the electromagnetic radiation from the first portion of the plurality of integrity-sensing optical fibers with an optical reflector coupled to the distal end of the downhole slickline cable; reflecting the electromagnetic radiation with the optical reflector into a second portion of the plurality of integrity-sensing optical fibers, and receiving the electromagnetic radiation from the second portion of the plurality of integrity-sensing optical fibers with the detector. Element 21: wherein a distal end of each integrity-sensing optical fiber is coated with a reflective coating, and wherein receiving the electromagnetic radiation from the plurality of integrity-sensing optical fibers comprises receiving the electromagnetic radiation as reflected from the distal end of each integrity-sensing optical fiber. Element 22: wherein receiving the electromagnetic radiation from the plurality of integrity-sensing optical fibers comprises providing the electromagnetic radiation to one or more first integrity-sensing optical fibers of the plurality of integrity-sensing optical fibers with the electromagnetic radiation source, receiving the electromagnetic radiation from the one or more first integrity-sensing optical fibers with a multi-fiber turnaround sub coupled to the distal end of the downhole slickline cable, transmitting the electromagnetic radiation with the multi-fiber turnaround sub to one or more second integrity-sensing optical fibers of the plurality of integrity-sensing optical fibers, and receiving the electromagnetic radiation from the one or more second integrity-sensing optical fibers with the detector. Element 23: wherein one or more of the plurality of integrity-sensing optical fibers is exposed to a wellbore environment, and wherein receiving the electromagnetic radiation from the plurality of integrity-sensing optical fibers comprises receiving thermal radiation with the detector as transmitted from the wellbore environment to the one or more of the plurality of integrity-sensing optical fibers. Element 24: wherein a thermal radiation cap is coupled to the distal end, and wherein receiving the electromagnetic radiation from the plurality of integrity-sensing optical fibers comprises receiving thermal radiation with the detector as transmitted from the wellbore environment to the plurality of integrity-sensing optical fibers at the distal end. Element 25: wherein determining the mechanical and structural integrity of the downhole slickline cable comprises detecting a crack or delamination in the downhole slickline cable based on the intensity of the electromagnetic radiation received by the detector. Element 26: wherein determining mechanical and structural integrity of the downhole slickline cable comprises detecting ingress of hydrogen into the downhole slickline cable based on a time-dependent trend in the intensity of the electromagnetic radiation received by the detector. Element 27: further comprising locating a defect in the downhole slickline cable based on a signal pattern of the electromagnetic radiation received by the detector. Element 28: wherein the downhole slickline cable further comprises at least one energy transmission line positioned within the polymer composite, the method further comprising using the at least one energy transmission line for at least one of downhole telemetry and sensing one or more downhole parameters. Element 29: wherein the at least one energy transmission line comprises one or more of the plurality of integrity-sensing optical fibers.

By way of example, embodiment A may be combined with: Elements 1, 2, and 3; Elements 1, 4, and 5; Elements 1, 4, and 6; Elements 8 and 9; Elements 1, 4, and 9; etc.

Further by way of example, embodiment B may be combined with: Elements 10 and 11; Elements 10, 11, and 12; Elements 15 and 16; Elements 10 and 18; Elements 10, 17, and 18; etc.

Further by way of example, embodiment C may be combined with: Elements 19 and 20; Elements 19, 20, and 21; Elements 20 and 22; Elements 19 and 23; Elements 19, 24, and 25; Elements 27, 28, and 29; etc.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a"

or "an," as used in the claims, are defined herein to mean one or more than one of the element that it introduces.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A system, comprising:
   a downhole slickline cable having a surface end, a distal end, and comprising a polymer composite and a plurality of integrity-sensing optical fibers embedded within the polymer composite, wherein the plurality of integrity-sensing optical fibers extends along an axial length of the downhole slickline cable; and
   a detector arranged at the surface end and configured to:
      receive electromagnetic radiation conveyed through the plurality of integrity-sensing optical fibers;
      process the received electromagnetic radiation; and
      detect a decrease in an intensity of the processed electromagnetic radiation,
   wherein the decrease in the intensity of the electromagnetic radiation corresponds to breakage of one or more integrity-sensing optical fibers, and breakage of the one or more integrity-sensing optical fibers is indicative of a crack or delamination of the downhole slickline cable.

2. The system of claim 1, further comprising one or more energy transmission lines positioned within the downhole slickline cable.

3. The system of claim 1, wherein the plurality of integrity-sensing optical fibers are embedded in a polymer matrix sheet arranged in a spiral pattern within the polymer composite.

4. The system of claim 1, wherein the plurality of integrity-sensing optical fibers are arranged randomly as embedded within the polymer composite.

5. The system of claim 1, wherein one or more of the plurality of integrity-sensing optical fibers has a cladding disposed thereon, the cladding being a material selected from the group consisting of a thermoplastic, a thermoset, a metal, a carbon coating, a non-carbon coating, a carbon and polyimide dual-layer coating, any derivative thereof, and any combination thereof.

6. The system of claim 1, further comprising an electromagnetic radiation source arranged at the surface end to provide the electromagnetic radiation to the plurality of integrity-sensing optical fibers.

7. The system of claim 1, further comprising an optical reflector coupled to the distal end of the downhole slickline cable.

8. The system of claim 1, wherein a distal end of each integrity-sensing optical fiber is coated with a reflective coating.

9. The system of claim 1, further comprising a multi-fiber turnaround sub coupled to the distal end of the downhole slickline cable and connecting one or more pairs of the plurality of integrity-sensing optical fibers.

10. The system of claim 1, further comprising a thermal radiation cap coupled to a distal end of the plurality of integrity-sensing optical fibers.

11. A method, comprising:
    conveying a downhole slickline cable into a wellbore, the downhole slickline cable having a surface end, a distal end, and comprising a polymer composite and a plurality of integrity-sensing optical fibers embedded within the polymer composite, wherein the plurality of integrity-sensing optical fibers extends along an axial length of the downhole slickline cable;
    receiving electromagnetic radiation from the plurality of integrity-sensing optical fibers with a detector arranged at the surface end;
    processing the electromagnetic radiation received by the detector and detecting a decrease in an intensity of the electromagnetic radiation which corresponds to breakage of one or more integrity-sensing optical fibers; and
    determining the presence of a crack or delamination along the axial length of the downhole slickline cable based on the decrease in the intensity of the electromagnetic radiation.

12. The method of claim 11, further comprising providing the electromagnetic radiation to the plurality of integrity-sensing optical fibers with an electromagnetic radiation source arranged at the surface end.

13. The method of claim 12, wherein receiving the electromagnetic radiation from the plurality of integrity-sensing optical fibers comprises:
    providing the electromagnetic radiation to a first portion of the plurality of integrity-sensing optical fibers with the electromagnetic radiation source;
    receiving the electromagnetic radiation from the first portion of the plurality of integrity-sensing optical fibers with an optical reflector coupled to the distal end of the downhole slickline cable;
    reflecting the electromagnetic radiation with the optical reflector into a second portion of the plurality of integrity-sensing optical fibers; and
    receiving the electromagnetic radiation from the second portion of the plurality of integrity-sensing optical fibers with the detector.

14. The method of claim 12, wherein a distal end of each integrity-sensing optical fiber is coated with a reflective coating, and wherein receiving the electromagnetic radiation from the plurality of integrity-sensing optical fibers comprises receiving the electromagnetic radiation as reflected from the distal end of each integrity-sensing optical fiber.

15. The method of claim 12, wherein receiving the electromagnetic radiation from the plurality of integrity-sensing optical fibers comprises:
    providing the electromagnetic radiation to one or more first integrity-sensing optical fibers of the plurality of integrity-sensing optical fibers with the electromagnetic radiation source;
    receiving the electromagnetic radiation from the one or more first integrity-sensing optical fibers with a multi-fiber turnaround sub coupled to the distal end of the downhole slickline cable;

transmitting the electromagnetic radiation with the multi-fiber turnaround sub to one or more second integrity-sensing optical fibers of the plurality of integrity-sensing optical fibers; and receiving the electromagnetic radiation from the one or more second integrity-sensing optical fibers with the detector.

16. The method of claim 11, wherein one or more of the plurality of integrity-sensing optical fibers is exposed to a wellbore environment, and wherein receiving the electromagnetic radiation from the plurality of integrity-sensing optical fibers comprises receiving thermal radiation with the detector as transmitted from the wellbore environment to the one or more of the plurality of integrity-sensing optical fibers.

17. The method of claim 11, wherein a thermal radiation cap is coupled to the distal end, and wherein receiving the electromagnetic radiation from the plurality of integrity-sensing optical fibers comprises receiving thermal radiation with the detector as transmitted from a wellbore environment to the plurality of integrity-sensing optical fibers at the distal end.

18. The method of claim 11, wherein detecting a decrease in the intensity of the electromagnetic radiation further corresponds to an ingress of hydrogen into the downhole slickline cable based on a time-dependent trend in the intensity of the electromagnetic radiation received by the detector.

19. The method of claim 11, further comprising locating a defect in the downhole slickline cable based on a signal trend of the electromagnetic radiation received by the detector, wherein the detector measures the signal trend in the electromagnetic radiation, the measured signal trend indicating a stepwise degradation in the intensity of the electromagnetic radiation which corresponds to the breakage of the one or more integrity-sensing optical fibers.

20. The method of claim 11, wherein the downhole slickline cable further comprises at least one energy transmission line positioned within the polymer composite, the method further comprising using the at least one energy transmission line for at least one of downhole telemetry and sensing one or more downhole parameters.

21. The method of claim 20, wherein the at least one energy transmission line comprises one or more of the plurality of integrity-sensing optical fibers.

* * * * *